Sept. 22, 1970 G. H. HUBER 3,530,247

DIGITAL VOCODER CONFERENCE SYSTEM

Filed Aug. 29, 1967 4 Sheets-Sheet 1

INVENTOR
G. H. HUBER
BY
ATTORNEY

Sept. 22, 1970 G. H. HUBER 3,530,247

DIGITAL VOCODER CONFERENCE SYSTEM

Filed Aug. 29, 1967 4 Sheets-Sheet 4

United States Patent Office 3,530,247
Patented Sept. 22, 1970

3,530,247

DIGITAL VOCODER CONFERENCE SYSTEM

George H. Huber, Short Hills, N.J., assignor to Bell Telephone Laboratories, Incorporated, Murray Hill and Berkeley Heights, N.J., a corporation of New York Filed Aug. 29, 1967, Ser. No. 664,024
Int. Cl. G10l *1/08*
U.S. Cl. 179—1 7 Claims

ABSTRACT OF THE DISCLOSURE

In a system for the digital conferencing of vocoders, a composite sequence of code words representing the composite speech of simultaneous talkers is obtained by superimposing synchronized sequences of code words, each sequence representing the speech of one talker, on a common conductor. By amplitude limiting the pulses in the resulting composite sequence to a selected value, inverting the polarity of the amplitude-limited pulses, and then adding the resulting amplitude-limited, phase-inverted composite sequence separately to each of the synchronized sequences of code words, a unique composite sequence of code words is derived for transmission to each talker, this sequence representing the composite speech of all other simultaneous talkers.

BACKGROUND OF THE INVENTION

This invention relates to the digital conferencing of vocoders and, in particular, to a digitized vocoder conference system capable of reproducing the speech of both individual talkers and several simultaneous talkers.

Prior art systems for the digital conferencing of vocoders are relatively complex, requiring sophisticated synchronizing and combining circuits to produce composite code words representing the speech of simultaneous talkers. A typical prior art system is described, for example, by Rader and Crowther in the January 1966 Proceedings of the IEEE, page 95. Rader and Crowther, in the case of simultaneous talkers, generate code words representing the speech energy in contiguous frequency bands of the speech of each of the simultaneous talkers. Code words representing the energy in corresponding frequency bands of the speech of the simultaneous talkers are then compared in comparison circuits and only the largest such code word in each frequency band is transmitted to the listeners. Thus, the synthesized simultaneous speech is a composite of the loudest components selected from all the talkers. The logic equipment required to carry out these operations is complex and expensive.

J. M. Kelly and R. N. Kennedy in patent application Ser. No. 664,023, filed Aug. 29, 1967 describe another system for the digital conferencing of vocoders. Kelly and Kennedy combine, on an RMS basis, digital code words representing the speech energy in corresponding frequency bands of the speech of several simultaneous talkers. The resulting composite code words represent a high-quality composite speech signal, but this scheme again requires complex and expensive digital equipment.

SUMMARY OF THE INVENTION

This invention, in contrast, provides an extremely simple system for combining two or more simultaneously generated bit streams representing the speech of two or more simultaneous talkers. According to this invention, the simultaneous bit streams are merely synchronized and then superimposed on a common conductor or "bus." The resulting composite bit stream, when amplitude limited by a selected amount, is equivalent to one produced by funneling the simultaneous bit streams through a logical OR gate. That is to say, each bit of the composite bit stream represents a positive, or "high," signal when one or more logical "1's" are combined, and a "low" signal when only logical "0's" are combined. Composite code words derived from the bit stream represent the composite speech of all simultaneous talkers. These composite code words are slightly larger than the maximum code words from the several simultaneous bit streams except when simultaneous code words in the several bit streams are identical. Then each resulting composite code word is the same as the identical simultaneous code words.

To prevent a talker from receiving an echo of his own speech, echo suppression is provided. The echo suppressor essentially subtracts out a talker's own digital code words prior to sending the composite digital code words to that talker. As a result, a talker hears all simultaneous talk but his own.

A composite pitch signal produced by this invention either equals or is slightly higher than the highest input pitch frequency. In addition, the composite speech signal is voiced if any input speech is voiced. Despite these limitations, the resulting composite speech signal is of acceptable quality and the system itself is extremely simple and thus inexpensive.

This invention may be more fully understood from the following detailed description of the preferred embodiments thereof, taken together with the following drawings.

DETAILED DESCRIPTION

Figure 1:
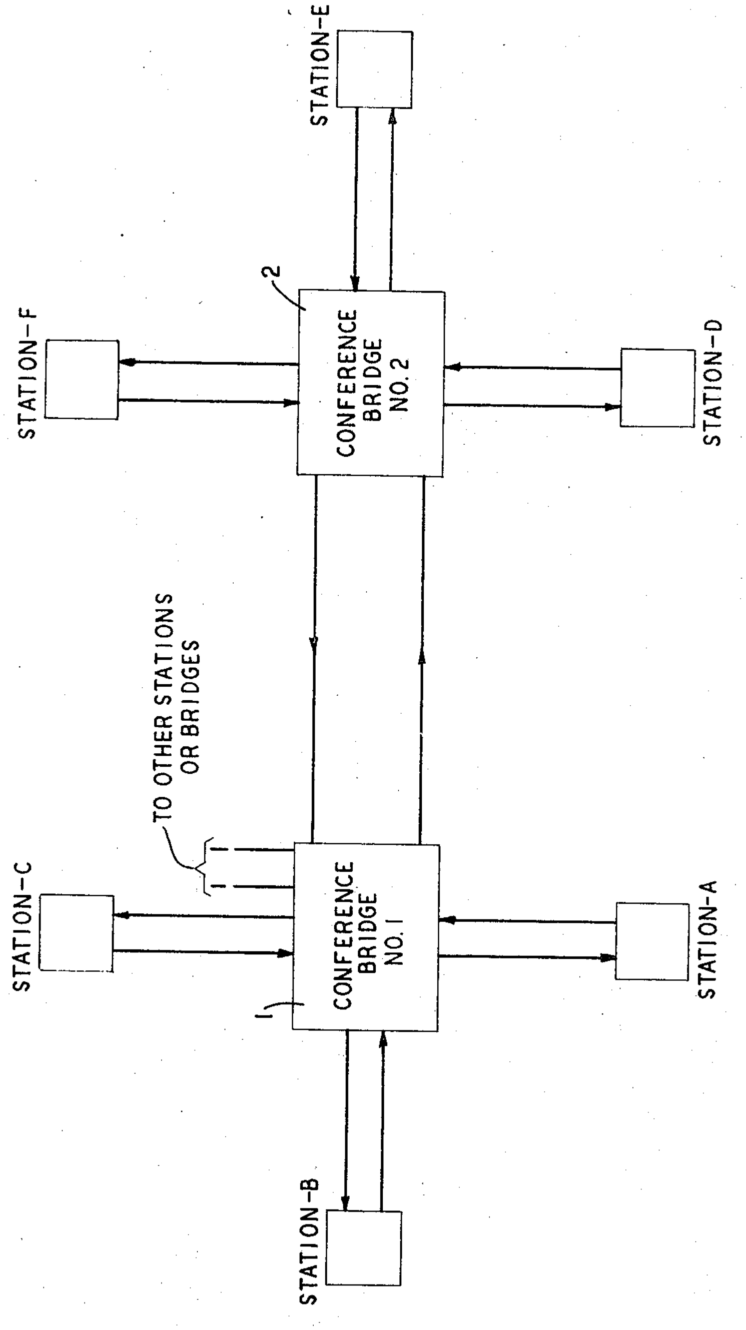
FIG. 1 is a schematic block diagram of an embodiment of this invention using two conference bridges.

FIG. 1 shows a typical conference arrangement using the principles of this invention. Stations A through F each represent the vocoder apparatus required for a single speaker. Of course, more than one person can use each station if desired.

Each station contains a vocoder analyzer for converting the speech of a talker at that station into digital code words and a vocoder synthesizer for producing a replica of the single or composite speech of other talkers at the other stations. Furthermore, while only two conference bridges and six stations are shown in FIG. 1, other stations or conference bridges can be connected, as shown, to the conference bridges.

Each station has its own data clock for controlling the bit rate of the digital data produced at that station. Data clocks at all the stations differ in frequency by approximately 1 bit in $10^5$. Thus, essentially each station will produce $100{,}000\pm1$ data bits in the same time period.

Each conference bridge 1, 2 contains apparatus for synchronizing the digital code words from each of the stations producing and sending code words directly to the conference bridge. The digital code words arriving at each conference bridge are synchronized independently of the digital code words arriving at other conference bridges. Furthermore, conference bridge 1 receives, in addition to digital code words from stations A, B and C, digital code words from conference bridge 2. These code words represent either the single or simultaneous speech of talkers at the several stations connected to conference bridge 2. Bridge 1 processes these code words just as though they were digital code words representing the speech of a single talker at a separate station connected to bridge 1.

Bridge 2 works in the same manner as bridge 1.

Because the digital code words from each of the stations have in general been normalized, each conference bridge contains apparatus for denormalizing these digital code words. This denormalizing ensures that these digital code words have the correct relative amplitudes prior to combination. However, while the embodiment of this invention is described using normalizing, normalizing is not necessary to the operation of this invention.

Figure 2:
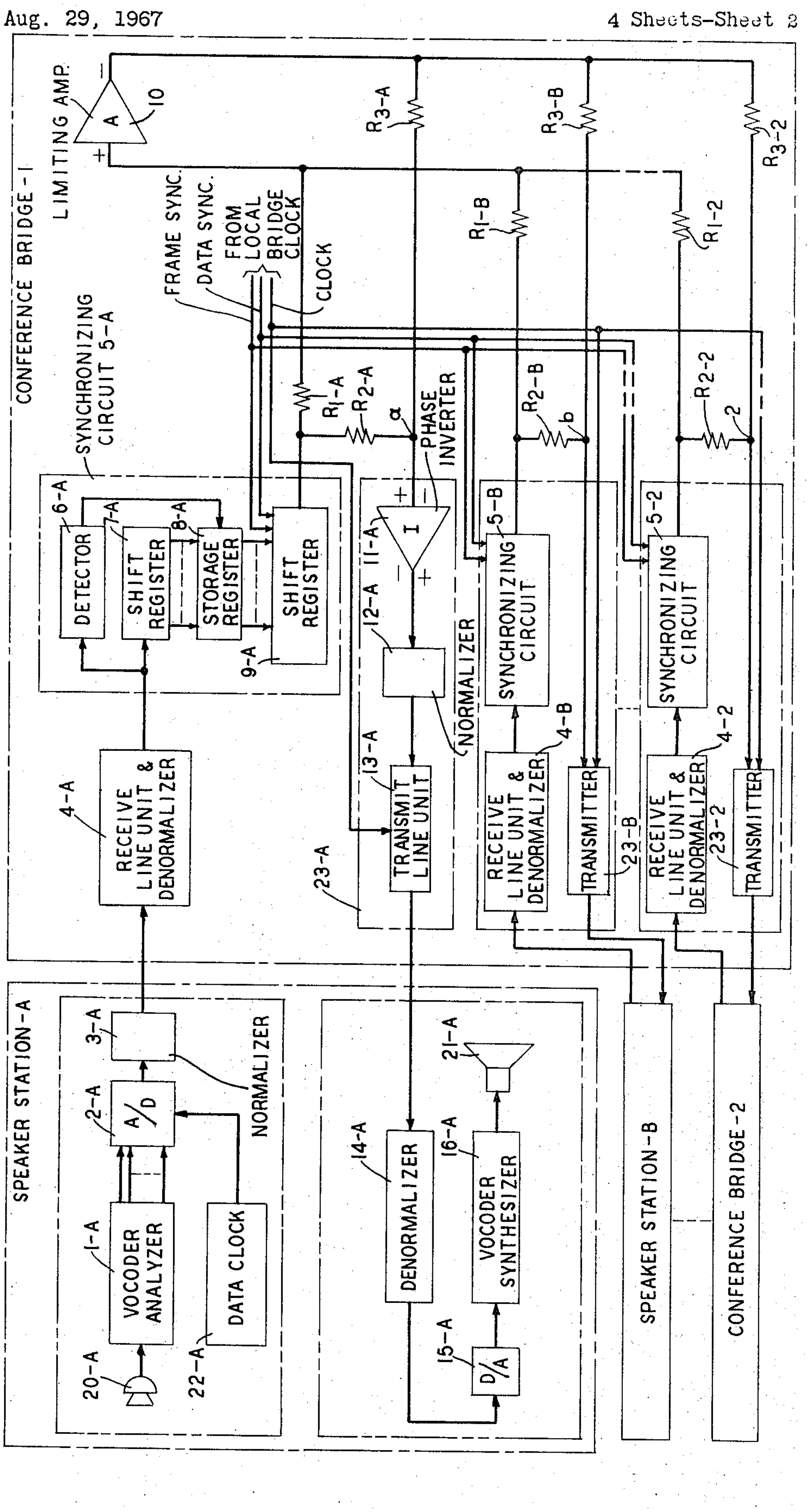
FIG. 2 is a schematic block diagram of conference bridge 1 and station A, both shown in FIG. 1.

FIG. 2 shows in detail conference bridge 1 and speaker station A. Conference bridge 2 is, of course, identical in structure to conference bridge 1. While conference bridge 1 connects stations A, B and C to the other conference bridges and speaker stations in the conferencing system, only the operation of the apparatus in bridge 1 associated with station A will be described in detail. The apparatus in bridge 1 associated with the other speaker stations and conference bridges connected to bridge 1 operates in an identical fashion and thus will not be described.

A talker's speech at station A is converted into an electrical signal by transducer 20–A. Vocoder analyzer 1–A then converts this electrical signal into a plurality of so-called "spectrum control signals" representing the amplitudes of subsignals occupying contiguous frequency bands of the original speech signal. In addition, analyzer 1–A produces so-called excitation signals which indicate whether the speech is voiced or unvoiced, and, if voiced, give the pitch frequency. These spectrum control signals and excitation signals are converted into a serial sequence of digital code words in analog-to-digital converter 2–A, driven by data clock 22–A. The digital code words representing the spectrum control signals are normalized in circuit 3–A.

Figure 4:
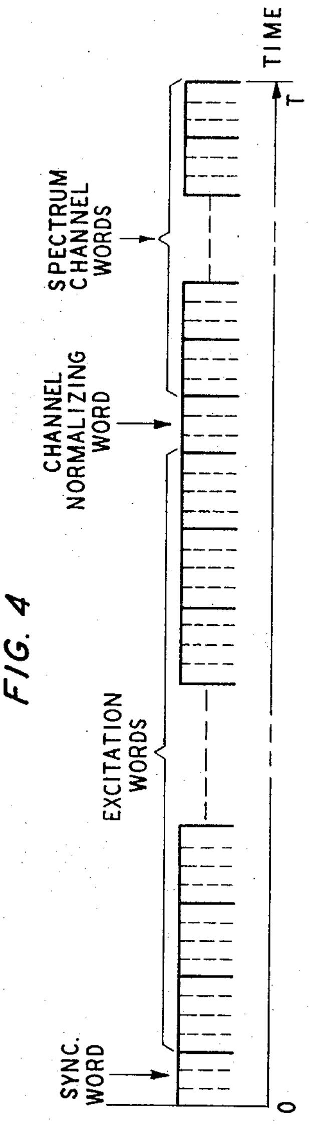
FIG. 4 shows the format of one frame of data produced by a typical vocoder analyzer at a speaker station in the embodiment of FIG. 1.

In brief, converter 2–A sequentially and repetitively samples the analog spectrum and excitation signals from analyzer 1–A and converts the resulting samples into a serial train of data pulses. A set of data pulses, composed of one encoded sample from each spectrum and excitation signal, is called a "frame" of data. As shown in FIG. 4, a frame of data from a typical speaker station contains first a synchronization code word generated by the station data clock 22–A (FIG. 2). The next few words in the frame represent the excitation information. Following the excitation words comes the spectrum normalizing code word. This word contains the information necessary to denormalize the normalized code words representing the amplitudes of subsignals occupying contiguous frequency bands of the speech—the so-called spectrum code words. The spectrum code words follow the normalizing code word. All these code words are transmitted, in frames, from the speaker station to conference bridge 1. As is well known in the digital arts, each frame of data contains a fixed number of "bits," each bit being in the form of a voltage pulse whose amplitude represents either a binary zero or one. The bit rate of the data in each frame is in turn controlled by the station data clock 22–A.

Conference bridge 1 (FIG. 2) contains apparatus for denormalizing the code words received from a plurality of speaker stations and conference bridges together with apparatus for combining simultaneously generated sequences of code words in selected combinations for retransmission to connected speaker stations and conference bridges. Thus, the sequence of digital code words from station A is detected by receive line unit and denormalizer 4–A. Unit 4–A denormalizes these code words to produce a sequence of digital code words representing the excitation and denormalized spectrum signals of the talker at station A.

When several talkers speak simultaneously at several speaker stations, conference bridge 1 receives several simultaneous sequences of digital code words. These digital code words are not synchronized because each speaker station has its own data clock, for example, 22–A (FIG. 2), to control the rate at which it produces digital code words. While the data clocks at all the stations have approximately the same frequency, environmental differences and manufacturing tolerances cause the frequencies of the data clocks to vary slightly from design frequency. Moreover, the clocks are started and stopped arbitrarily and thus, in general, are not phase synchronized. Thus, when several talkers speak simultaneously, as, for example, at stations A, B and F (FIG. 1), conference bridge 1 receives several unsynchronized sequences of digital code words. The sequences from stations A and B travel directly to bridge 1. The sequence from station F travels to bridge 1 through bridge 2. These sequences must be synchronized before they can be combined. Synchronizing circuits 5 (FIG. 2) containing detectors 6, shift registers 7, storage registers 8, and shift registers 9, are provided at bridge 1 together with a conference bridge clock (not shown) to carry out this synchronization.

Thus, the sequence of code words from unit 4–A, representing the speech of a talker at station A, is placed in series in shift register 7–A. The total number of bits contained in each frame of data from a speaker station is known. When shift register 7–A contains one frame of data, with the frame synchronization word in a specified location in register 7–A, detector 6–A, which counts the number of bits which have entered shift register 7–A, produces a control pulse. This control pulse activates storage register 8–A with the result that the pulses representing the frame of data stored in register 7–A are "jammed," that is, transferred in parallel, into storage register 8–A. Detector 6–A also contains threshold detection apparatus for determining whether the voltage pulses produced by unit 4–A represent information bearing signals or noise. Basically, the number of pulses counted by detector 6–A in a given period of time must exceed a selected minimum before detector 6–A activates storage register 8–A. Such threshold detection devices are well known.

The conference bridge clock, not shown, has approximately the same frequency as each of the speaker station clocks. This clock is used to control the transfer of data from storage registers 8 to shift registers 9. Thus, the data in storage register 8–A is transferred to shift register 9–A simultaneously with the identical transfer to registers 9–B, 9–C, and 9–2 (not shown) of similarly stored data received at bridge 1 from other speaker stations and conference bridges connected, as shown in FIG. 1, to bridge 1.

The data bits in shift register 9–A (FIG. 2) are read out, in sequence, in response to control pulses from the conference bridge clock. These bits are sent along two paths. Resistor $A_{1-A}$ connects the output lead from shift register 9–A to the input lead to limiting and phase inverting amplifier 10. Resistor $R_{2-A}$ connects the output lead from shift register 9–A directly to the input lead to transmitter 23–A. Transmitter 23–A includes amplifier 11–A, normalizer 12–A, and transmit unit 13–A for processing a sequence of composite digital code words for transmission to speaker station A.

Figure 3:
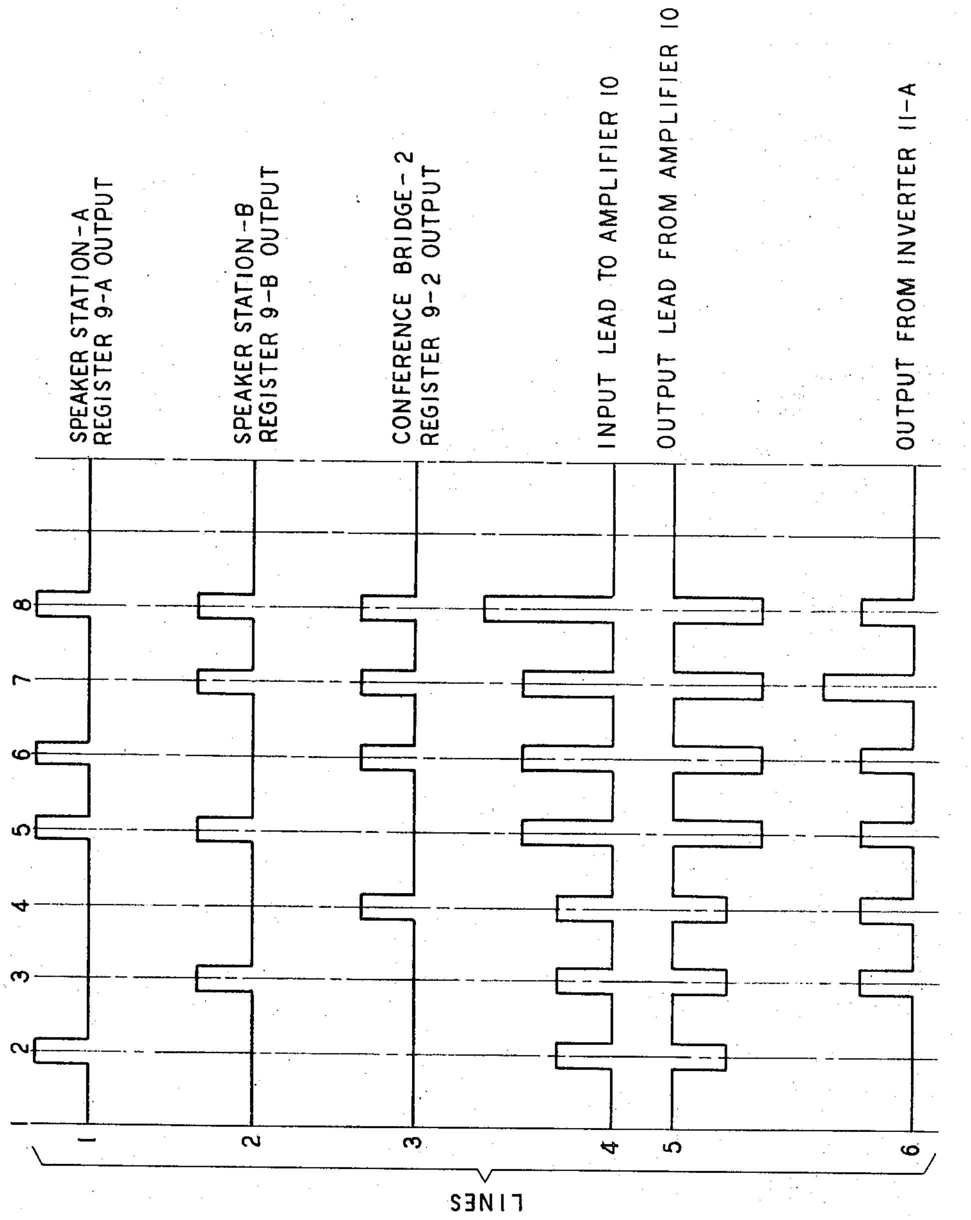
FIG. 3 is a diagram of pulse sequences produced at several points in the embodiment of FIG. 2.

In addition, resistors $R_{1-B}$ and $R_{1-2}$ connect the output leads from shift registers 9–B and 9–2 (not shown) in circuits 5–B and 5–2, respectively, to the input lead to amplifier 10. Because of this arrangement, synchronized data bits representing all simultaneously generated sequences of digital code words are superimposed on the input lead to limiting amplifier 10 to produce bits representing a composite sequence of code words. Limiting amplifier 10 limits the voltage of each pulse in this composite sequence of code words to twice the voltage of each pulse in the input code words. If, for example, each voltage pulse from a speaker station has an amplitude of 1 volt when it represents a binary 1, and an amplitude of zero volts when it represents a binary zero, the superposition of three simultaneously occurring pulses representing a binary 1 will produce a pulse of 3 volts. Thus, as shown in FIG. 3, the eighth bits from stations A, B and conference bridge 2 are all pulses of one volt. These pulses are combined on the input lead to amplifier 10 to produce one composite pulse three volts high, as shown on line 4 of FIG. 3. Amplifier 10 (FIG. 2) limits the amplitude of this pulse to 2 volts—just twice the amplitude of a single pulse. This feature, i.e., limiting to twice the amplitude of a single logical "1" pulse, is utilized for cancelling out a talker's own speech from the composite speech of other simultaneous talkers, in a fashion to be explained later. In addition, amplifier 10 inverts the polarity of this pulse as shown on line 5 of FIG. 3. Thus, the output sequence of pulses from amplifier 10 is inverted in polarity, and any given pulse in this sequence is at most twice the amplitude of a single input pulse.

The output sequence of pulses from amplifier 10 is derived from all the simultaneously generated sequences of code words and thus is a composite of these code words. Now to prevent distraction, a given talker must hear only other simultaneous talkers, but not a delayed version of his own speech—a so-called echo. Thus, before this composite sequence of code words is transmitted to a talker, that talker's contribution to this composite sequence must be removed. Because the polarity of the composite sequence of code words has been inverted relative to the polarity of each of the input sequences of code words to amplifier 10, each talker's contribution to this composite sequence can be removed by merely adding the sequence of code words representing that talker to the composite sequence. Thus, the composite sequence of code words from amplifier 10 is passed through resistor $R_{3-A}$ and is added, at node *a*, to the sequence of code words generated by the talker at speaker station A. Eight bits from one possible resulting composite sequence of code words, after being inverted in phase in amplifier 11–A are shown on line 6 of FIG. 3. Thus, the coded speech of a talker at speaker station A (FIG. 3, line 1) is subtracted out of the composite code word developed in amplifier 10 (FIG. 3, line 5), thereby excluding the talker's own speech from the composite signal he receives. This sequence of code words is normalized in normalizer 12–A, and reshaped and transmitted to speaker station A by means of transmit line unit 13–A driven by the conference bridge clock (not shown). All pulses in this sequence with amplitudes above a selected threshold represent binary ones. Those beneath this threshold represent binary zeros. That is to say, only coded signals including logical "1's" and logical "0's" are transmitted to a speaker station.

At speaker station A, the received composite digital code words are denormalized in denormalizer 14–A, converted from digital-to-analog signals in converter 15–A, and synthesized into a replica of the composite speech of all the talkers at the other speaker stations in vocoder synthesizer 16–A. An acoustic replica of the composite speech signal is produced by passing the output signal from synthesizer 16–A through loudspeaker 21–A, which can, of course, be part of a telephone.

Each of the other speaker stations in the conference system operates in a similar manner. Thus, the operations of these other speaker stations will not be described in detail.

The operation of limiting amplifier 10, together with the superposition of synchronized simultaneous sequences of digital code words on the input lead to amplifier 10, is equivalent to a logical "OR" operation on the bits representing the simultaneous speech of all speakers. However, if, for example, only the talker at station A is speaking, the input voltage to amplifier 10 will be, to use the voltage level cited earlier, 1 volt. The output signal from amplifier 10 will be received at all other speaker stations except speaker station A. Speaker station A will receive nothing because amplifier 10 produces a phase-inverted sequence of digital code words which are canceled when combined at node *a* with the original sequence of code words. If, however, a talker at another station generates a sequence of digital code words simultaneously with the sequence generated by the talker at station A, station A will receive a sequence representing the speech of the talker at the other station, and the other station will receive a sequence representing the speech of the talker at station A. This occurs because the bits in the combined digital code words have a maximum amplitude of 2 volts. Thus, when the phase-inverted output sequence of code words from amplifier 10 is combined separately with the individual sequences of input code words to amplifier 10 for transmittal to each of the two speaker stations contributing to this composite sequence, the contribution from each station cancels out, leaving only the contribution from the other station. Those stations, however, which generate no code words receive the unaltered composite sequence of code words from amplifier 10.

The apparatus for combining simultaneously generated sequences of digital code words is extremely simple and thus inexpensive. Yet, surprisingly, the quality of speech is quite acceptable. The speech of each of a small number of simultaneous speakers is easily detectable, as are identifying characteristics of the speakers.

Other embodiments incorporating the principles of this invention will be obvious to those skilled in the digital communication arts.

What is claimed is:

1. In a telephone conference system of the type which includes a plurality of individual speaker stations interconnected by a multiplicity of conference bridges, each of said speaker stations including a digital vocoder analyzer for transforming speech into a sequence of outgoing digital code words and a digital vocoder synthesizer for transforming incoming digital code words from others of said speaker stations into speech signals, and wherein each of said conference bridges includes means responsive to digital code words simultaneously generated at a plurality of said speaker stations for generating sequences of a composite of said simultaneous digital code words and means for transmitting the sequences of said composite digital code words to selected ones of said speaker stations, the improvement which comprises, means in each of said conference bridges for synchronizing digital code words simultaneously received from said plurality of speaker stations and others of said conference bridges, and means in each of said conference bridges for superimposing selected combinations of said synchronized code words to produce said sequences of composite digital code words to be transmitted to selected ones of said speaker stations.

2. Apparatus as in claim 1 in which said means for superimposing includes:

a common conductor on which all digital code words simultaneously received at said conference bridge are superimposed after synchronization to produce a first sequence of composite digital code words representing the composite speech of all simultaneous talkers, said composite digital code words containing pulses of varying amplitudes, an amplifier, connected to said common conductor, for limiting the amplitudes of said pulses of varying amplitudes to a maximum of twice the amplitude of the pulses in said digital code words simultaneously received at said conference bridge, and for inverting the phase of the resulting amplitude-limited pulses to produce a second sequence of composite digital code words composed of amplitude-limited, phase-inverted pulses, and means for adding said second sequence of composite digital code words to said digital code words simultaneously received at said conference bridge, so as to produce said sequences of composite code words for transmission to selected ones of said speaker stations.

3. Apparatus as in claim 2 wherein said means for adding includes means for providing each speaker station connected to said conference bridge with a sequence of composite code words representing the speech of all talkers except those at said station, and means for providing each conference bridge connected to said conference bridge with a sequence of composite code words representing the speech of all talkers except those at speaker stations connected directly or indirectly to the conference bridge to which the sequence is being sent.

4. In a digital vocoder telephone conference system utilizing a multiplicity of conference bridges to interconnect a plurality of speaker stations, the improvement in each of said conference bridges which comprises, means for synchronizing a plurality of sequences of digital code words simultaneously received at a conference bridge but asynchronously generated at a plurality of speaker stations, said digital code words being composed of individual pulses each having a preestablished amplitude, means for superimposing the synchronized sequences of digital code words to produce a first composite sequence of code words composed of pulses having several different amplitudes, means for limiting the amplitude of individual ones of said pulses in said first composite sequence of code words to twice that of said preestablished amplitude, thereby producing an amplitude-limited version of said first composite sequence of code words, and means for combining said amplitude-limited version of said first composite sequence of code words individually with each of said synchronized sequences of code words received at said conference bridge from said speaker stations to produce a plurality of second composite sequences of code words, each of said second composite sequences of code words including all but a corresponding one of said plurality of simultaneously but asynchronously generated sequences of code words.

5. Apparatus as in claim 4 in which said means for superimposing comprises a common conductor.

6. Apparatus as in claim 4 in which said means for limiting and said means for combining comprises:

an amplifier for limiting the amplitude of said pulses in said first composite sequence of code words to twice the amplitude of the pulses in each of said synchronized sequences of code words, and for inverting the phase of the resulting amplitude-limited pulses to produce an amplitude-limited, phase-inverted version of said first composite sequence of code words, and means for separately algebraically adding said amplitude-limited, phase-inverted version of said first composite sequence of code words to each of said synchronized sequences of code words to produce a plurality of second composite sequences of code words, each of said second composite sequences of code words including all but a corresponding one of said plurality of simultaneously but asynchronously generated sequences of code words.

7. A system for the digital conferencing of vocoders which comprises, a plurality of speaker stations, each containing a vocoder analyzer for converting speech into a sequence of outgoing digital code words, and a vocoder synthesizer for converting incoming digital code words into speech, a multiplicity of connected conference bridges interconnecting said plurality of speaker stations, wherein each of said conference bridges includes, means for receiving said outgoing digital code words from said plurality of speaker stations, means for synchronizing sequences of a plurality of said digital code words simultaneously received at said bridge from a plurality of said speaker stations, said received sequences of code words including individual bits having preestablished amplitudes, means for selectively superimposing said synchronized sequences of digital code words to generate first composite sequences of digital code words representative of said simultaneously received digital code words, said first composite sequences of code words including individual bits having amplitudes equal to the sum of the amplitudes of the individual bits of the superimposed synchronized sequences of code words, means for limiting the amplitude of the individual bits of said first composite sequences of code words to an amplitude no greater than twice that of the individual bits of said simultaneously received code words, said limiting means including means for inverting the plurality of the signals representing the individual bits of said first composite sequences of code words, and means for selectively combining the resulting amplitude-limited, polarity-inverted, version of said first composite sequences of code words with each of said simultaneously received code words from said speaker stations to generate a corresponding number of second composite sequences of code words for transmission to the individual speaker stations, each of said second composite sequences excluding the sequence of code words received from said individual speaker station.

References Cited

UNITED STATES PATENTS 3,387,095 6/1968 Miller et al. --------- 179—18

KATHLEEN H. CLAFFY, Primary Examiner

D. W. OLMS, Assistant Examiner